No. 615,140. Patented Nov. 29, 1898.
F. L. CLARK.
HYDRAULIC BRAKE.
(Application filed Oct. 11, 1897.)
(No Model.) 2 Sheets—Sheet 1.
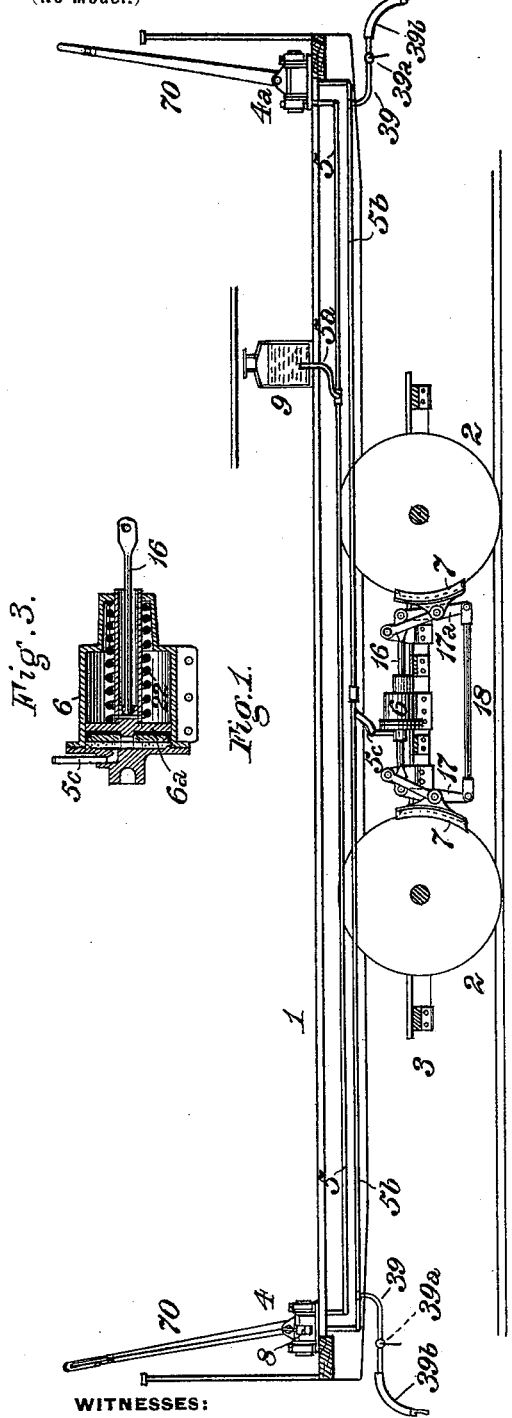
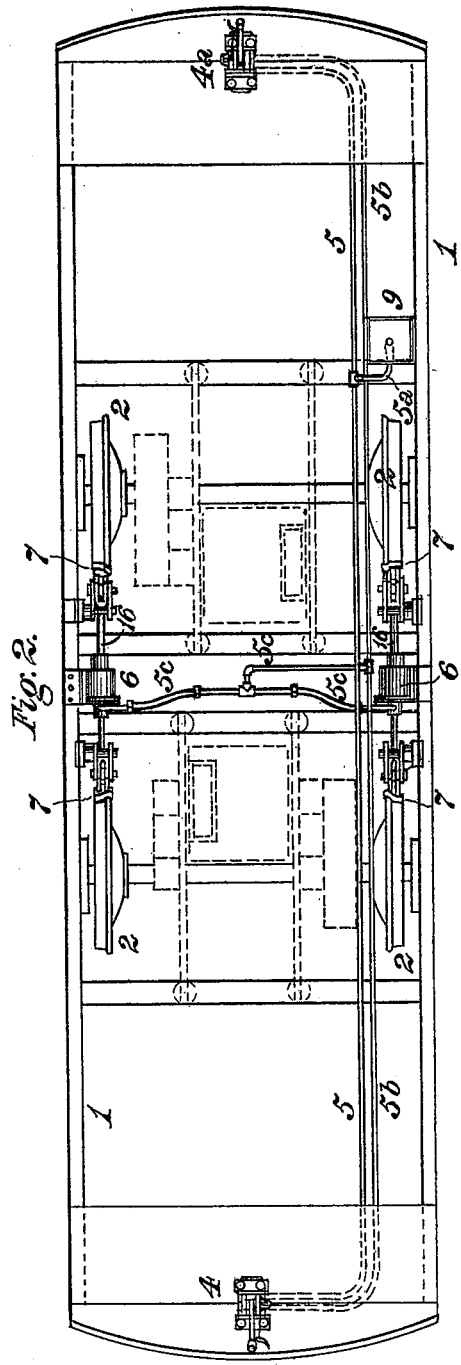
WITNESSES:
Chas. F. Miller.
S. R. Bell.
INVENTOR
Francis L. Clark
by J. Snowden Bell,
Att'y.

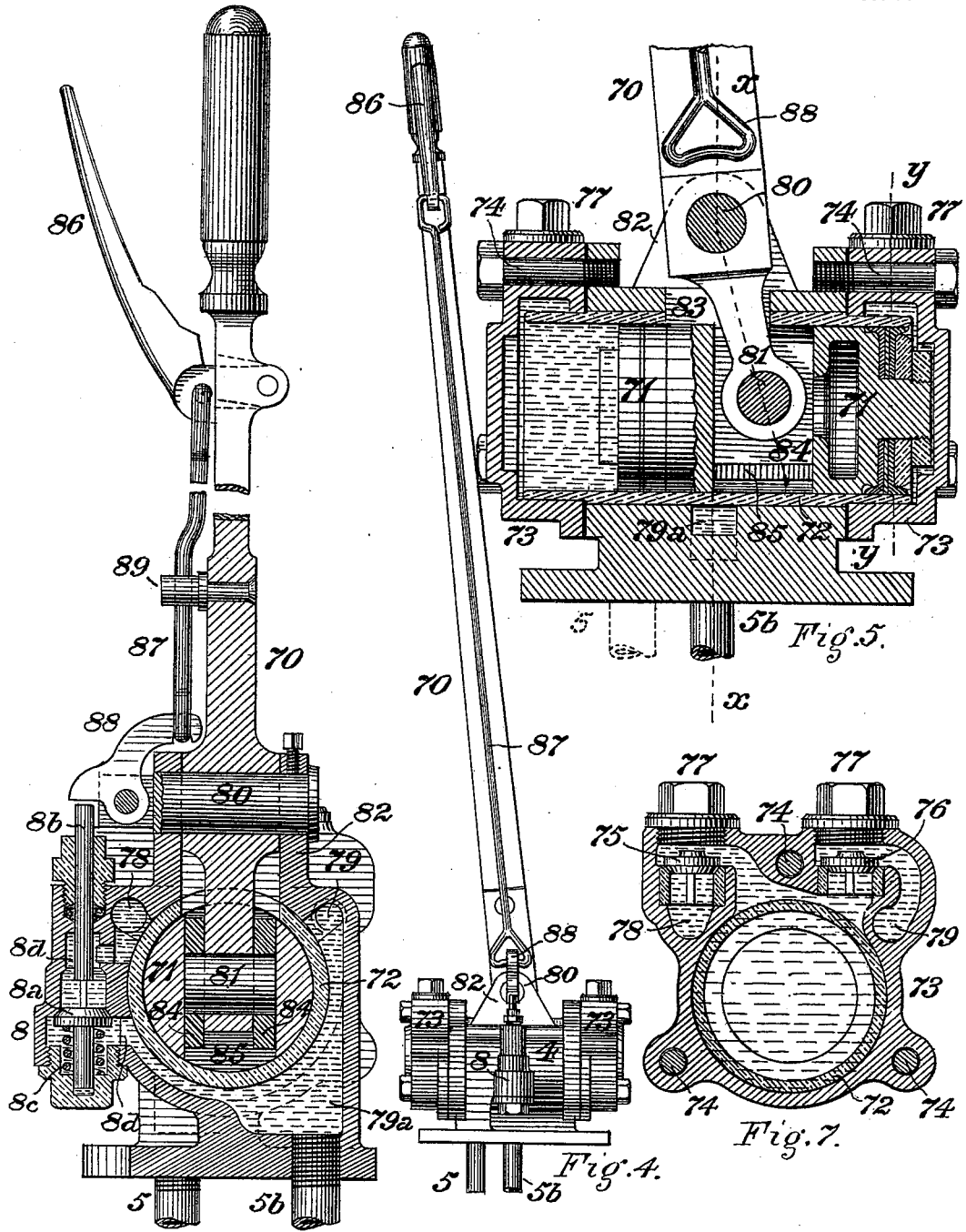

UNITED STATES PATENT OFFICE.

FRANCIS L. CLARK, OF STEWART STATION, PENNSYLVANIA, ASSIGNOR TO THE CLARK BRAKE COMPANY, OF PITTSBURG, PENNSYLVANIA.

HYDRAULIC BRAKE.

SPECIFICATION forming part of Letters Patent No. 615,140, dated November 29, 1898.

Application filed October 11, 1897. Serial No. 654,843. (No model.)

*To all whom it may concern:*

Be it known that I, FRANCIS L. CLARK, of Stewart Station, in the county of Westmoreland and State of Pennsylvania, have invented a certain new and useful Improvement in Hydraulic Brakes, of which improvement the following is a specification.

The object of my invention is to provide a simple, efficient, and comparatively inexpensive brake mechanism designed more particularly for electric or other street railroad cars, in the operation of which by a slight exertion of manual power the brakes may be promptly and powerfully applied by the action of hydraulic pressure and the degree of force of the application of the brakes be governed wholly by the motorman or other operator.

To this end my invention, generally stated, consists in the combination of a manually-operated pump, a communicating liquid-reservoir and pipe system, a brake-cylinder having a piston actuated by liquid under pressure applied by the pump and connected to a brake shoe or shoes, and a releasing device controlling communication between the opposite sides of the pump-piston.

The improvement claimed is hereinafter fully set forth.

In the accompanying drawings, Figure 1 is a diagrammatic longitudinal section through a car-frame and running-gear, illustrating the application of a brake apparatus embodying my invention; Fig. 2, a plan or top view of the same; Fig. 3, a longitudinal section, on an enlarged scale, through a brake-cylinder; Fig. 4, a side view in elevation of a pump and operating-lever adapted for use in a brake system embodying my invention; Fig. 5, a longitudinal central section, on an enlarged scale, through the pump cylinder, piston, and heads; Fig. 6, a transverse section through the same at the line $x\,x$ of Fig. 5, and Fig. 7 a similar section at the line $y\,y$ of Fig. 5.

In the practice of my invention as herein exemplified the brake apparatus is connected to and, except as to its pump, operating-lever, and releasing device, supported below the frame 1 of a car, which is carried upon four wheels 2, the axles of which are journaled in suitable bearings in a lower frame 3.

The essential elements of the apparatus, which, with their accessories, will be hereinafter more fully described, are a pump 4, which is connected to the car-frame in position to be conveniently actuated by the motorman by means of a hand-lever 70; a reservoir 9 for containing any suitable liquid, as water charged with some antifreezing material; a system of piping 5 $5^a$, &c., connecting the pump with the reservoir and with one or more brake-cylinders; a brake-cylinder 6, fitted with a piston $6^a$, the rod 16 of which is suitably connected with a brake shoe or shoes 7, and a releasing device, in this instance a manually-operated valve mechanism 8, for relieving the pressure in the brake-cylinder by establishing communication between the receiving and pressure sides of the pump-piston.

The pump, operating-lever, and releasing device are shown as duplicated in order to enable the brake apparatus to be operated from either end of the car; but it will be obvious that when these members at either end of the car are operated the corresponding members at the opposite end remain inactive.

The liquid-storage reservoir 9 is located in any convenient and preferred position on the floor of the car and is connected by a branch pipe $5^a$ with a suction-pipe 5, leading to the receiving side of the piston of the pump 4 and to that of the pump $4^a$ when two pumps are, as in this instance, provided. A delivery or pressure pipe $5^b$ leads from the pressure or forcing side of the pump piston or pistons to a connection with a branch pipe $5^c$, leading into each of the brake-cylinders 6, two of these being preferably, as shown, employed. In cases where the car is intended to haul another car or cars the pipe $5^b$ may be provided on either or both of its ends with a short section of flexible hose 39, controlled by a cock $39^a$ and having a suitable coupling-section $39^b$ for connection to the hose of another car, provided with a hydraulic brake mechanism.

The specific construction of the pump 4 is not an essential of my present invention and is not herein claimed, as such features thereof as are believed to be novel and patentable will form the subject of a separate application by me. It is, however, illustrated and described in order to exemplify a suitable form of releasing device and the relation of the same to the other members of the system. The pump 4 is in this instance shown as of the double-acting reciprocating-piston type. The pump-cylinder is secured upon the car-platform and is provided with a double-headed piston 71, which is fitted to reciprocate in a lining or bushing 72 between heads 73 which close the ends of the cylinder and are secured thereto by bolts 74. A suction or inlet valve 75 and a delivery-valve 76 are fitted to seat in each of the heads 73, said valves being inserted and removed through openings closed by screw-plugs 77 and respectively controlling communication between a longitudinal suction port or passage 78 and the bore of the bushing 72 and between said bore and an opposite delivery port or passage 79. The suction-pipe 5 communicates with the suction-port 78 and the delivery or pressure pipe $5^b$ communicates with a passage $79^a$, which extends partly around the bushing and opens into the delivery-port 79. The heads of the pistons 71 are suitably packed in the ordinary manner, and at each stroke of the piston the suction-valve at one end and the delivery-valve at the other are unseated and liquid passes into one end and out of the other end of the pump-cylinder, as in double-acting pumps of the ordinary construction.

The piston 71 is reciprocated by the application of manual power to a hand-lever 70, which is journaled on a pin 80, fixed in lugs 82, cast on the pump-cylinder. The hand-lever 70 projects below the pin 80 through a slot 83 in the pump-cylinder and its bushing and at its lower end is coupled by a pin 81 to a pair of plates 84, which are fitted to slide vertically in a central opening 85 formed in the piston 71, thereby permitting the required segmental traverse of the lower end of the hand-lever and the pin 81 about the axis of the fixed pin 80. The hand-lever 70 is made as long as its convenient operation will admit of, and the distance between the pins 80 and 81 being comparatively short a considerable leverage and consequent increase of power are afforded.

In order to effect the instantaneous release of the brake-shoes from the wheels when desired after they have been applied by the pressure exerted in the brake cylinder or cylinders 6 by the liquid forced thereinto by the pump through the delivery-pipe $5^b$ and branch pipe $5^c$, I provide a releasing device which controls communication between the receiving and the delivery or pressure sides of the pump-piston, the action of which is by opening such communication to release the pressure upon the brake-cylinder piston or pistons and to permit the liquid which has exerted the pressure to be discharged and pass backward through the pipe system and pump and by closing such communication to reinstate the apparatus in condition for another application of the brakes to be effected. In the instance shown the releasing device consists of a valvular mechanism contained in a casing 8, cast upon or otherwise fixed to the pump-cylinder, and operating connections for manually opening or unseating the release-valve of said mechanism. The release-valve $8^a$, which is normally brought and held to its seat in the casing 8 by a closing-spring $8^e$, controls a port or passage $8^d$, leading from the passage $79^a$ (which, as before stated, communicates with the delivery or pressure port 79 of the pump) to the suction-passage 78. Upon the unseating of the release-valve communication is opened between the passages 78 and 79, and a free passage of liquid and consequent release of pressure are effected, and when said valve is seated the actuation of the pump institutes pressure in the brake-cylinders for the application of the brakes as required.

The unseating of the release-valve may be conveniently effected by the means illustrated in the drawings, these consisting of a releasing-lever 86, which is pivoted to the hand-lever 70, a short distance below the handle thereof, a double-armed lever 88, which is pivoted to the pump-cylinder in position such that one of its arms normally stands above and close to the top of the stem $8^b$, which passes through a stuffing-box in the casing 8 and abuts against the top of the release-valve $8^a$, and a link 87, coupling the opposite arm of the lever 88 to the releasing-lever 86. The link 87 is guided by a slotted pin 89, fixed to the hand-lever 70. By moving the releasing-lever inwardly the lower arm of the lever 88 is depressed and abutting against the stem $8^b$, which rests upon the top of the release-valve, thereby unseats said valve. Upon the release of the hand of the operator from the lever 86 the release-valve is again seated by its closing-spring $8^e$.

While I have illustrated the release-valve as manually actuated in one direction only—that is, as to its opening movement—it will be obvious that, if preferred, a cock or valve adapted to be both opened and closed by the operator may be employed, and it will also be seen that the release-valve is not necessarily directly connected with the pump, as it may perform its function if interposed in any other preferred location between a suction and a pressure section of the system of piping through which liquid is moved by the pump. Its location as shown, however, and its operation by a lever connected to the hand-lever of the pump enable it to be actuated with great convenience and facility by the operator in charge without removing his hand from the pump-lever.

In the instance shown two brake-cylinders 6, fitted with suitable pistons $6^a$, are employed, and the piston-rod 16 of each brake-cylinder is coupled to a brake-lever $17^a$, which is connected to a brake-shoe 7 and is coupled by a brake-rod 18 to another brake-lever 17, which is in turn connected to a brake-shoe 7, adapted to act upon a wheel on another axle of the car. The foundation brake-gear is proportioned and combined in the ordinary manner, so as to afford as great a leverage as is desirable.

In order to effect an application of the brakes by an apparatus embodying my invention, the motorman or other operator makes a few strokes of the pump, only about three or four being ordinarily necessary, and thereby institutes hydraulic pressure exerted by liquid drawn from the reservoir and pipe system in the brake-cylinders, such pressure instantaneously applying the brakes with a degree of force directly proportional to the power exerted by the operator on the hand-lever of the pump. An advantageous feature of operation is found in the fact that if by inadvertence the brakes should be applied with undue force, so as to slide one or more of the wheels of the car, this improper condition is immediately brought to the attention of the operator by the cessation of the vibration of the liquid, the effect of which is transmitted to his hand through the operating-lever, thereby notifying him to slightly release the braking power. To release the brakes from the wheels, it is only necessary to open the release-valve, whereupon a backward circulation of the liquid and a release of pressure being instituted the brake-shoes are withdrawn from the wheels by the usual springs 22, which retract the pistons of the brake-cylinders in the ordinary manner.

I claim as my invention and desire to secure by Letters Patent—

1. In a brake apparatus, the combination, substantially as set forth, of a manually-operated pump, a communicating liquid-reservoir and pipe system, a brake-cylinder having a piston actuated by liquid under pressure applied by the pump and connected to a brake shoe or shoes, and a releasing device for controlling communication between the opposite sides of the pump-piston.

2. In a brake apparatus, the combination, substantially as set forth, of a pump, a hand operating-lever therefor, a liquid-reservoir and pipe system communicating with the pump, a brake-cylinder communicating with the pipe system and having its piston connected to a brake shoe or shoes, a releasing device for permitting backward circulation of liquid from the brake-cylinder to the pipe system and reservoir, and means for actuating said releasing device through a connection with the pump-operating lever.

3. In a brake apparatus, the combination, substantially as set forth, of a liquid-storage reservoir, a pump, a hand operating-lever for actuating the pump, a suction-pipe connecting the reservoir and pump, a brake-cylinder having its piston connected to a brake shoe or shoes, a delivery or pressure pipe connecting the brake-cylinder and pump, a release-valve controlling communication between the suction and delivery pipes, and a hand-lever for imparting movement to said valve.

FRANCIS L. CLARK.

Witnesses:
J. SNOWDEN BELL,
WALTER L. MERWIN.